United States Patent [19]

Moore et al.

[11] Patent Number: 4,887,703

[45] Date of Patent: Dec. 19, 1989

[54] OVERRIDING CLUTCH

[75] Inventors: Eugene A. Moore, Durham; Elmer B. Lutz, Hillsborough, both of N.C.

[73] Assignee: Honeywell Inc., Minneapolis, Minn.

[21] Appl. No.: 261,547

[22] Filed: Oct. 24, 1988

[51] Int. Cl.[4] ............................................. F16D 15/00
[52] U.S. Cl. ...................................... 192/45; 192/44; 192/110 R; 464/35
[58] Field of Search ................ 192/45, 44, 110 R; 464/35

[56] References Cited

U.S. PATENT DOCUMENTS

| | | | |
|---|---|---|---|
| 1,936,640 | 11/1933 | Pfauser | 192/44 |
| 2,373,812 | 4/1945 | Coop | 464/35 |
| 3,369,638 | 2/1968 | Hunt et al. | 192/44 |
| 3,487,902 | 1/1970 | Persson | 464/35 |

FOREIGN PATENT DOCUMENTS 277125  7/1914  Fed. Rep. of Germany ........ 192/44

*Primary Examiner*—Leslie A. Braun
*Assistant Examiner*—Nicholas Whitelaw
*Attorney, Agent, or Firm*—Howard Paul Terry

[57] ABSTRACT

An overriding clutch having a housing, an outer body, and an inner body, wherein the outer body and inner body are rotatable about a clutch axis. The outer body includes a peripheral wall with a radially inner surface and includes an end wall connected to the peripheral wall and to a first shaft portion. The inner body includes an annular wall portion and a second shaft portion connected to the annular wall portion; and has a compression member with a pair of diametrically opposite roller members. The compression member has a center portion and has a pair of enlarged end portions, which are received in a pair of bearing holes in the annular wall portion. The enlarged end portions have a pair of radially outer sides with a respective pair of end bearing surfaces for urging the respective roller members against the radially inner surface by equal and opposite radial forces, for transmitting a torque from the inner body to the outer body.

5 Claims, 2 Drawing Sheets

OVERRIDING CLUTCH

The invention relates to an overriding clutch, and in particular the invention relates to an overriding clutch having a compression member with diametrically opposite roller members.

BACKGROUND OF THE INVENTION

The prior art overriding clutch includes a support means, an outer body having a first shaft with an axis and having a radially inner surface and being rotatably mounted on the support means, and an inner body having a second shaft coaxial with the first shaft and having a radially outer surface and being rotatably mounted on the outer body, with said radially outer surface having a plurality of peripherally spaced flat portions having respective peripherally spaced roller members.

One problem with the prior art overriding clutch is that the plurality of roller members exert a plurality of unequal radial forces which cause a resultant side force on the inner body, that may lead to shaft misalignment and excessive bearing wear.

SUMMARY OF THE INVENTION

According to the present invention, an overriding clutch is provided. This overriding clutch comprises a support means, an outer body having a first shaft portion with an axis and having a radially inner surface and being rotatably mounted on the support means, and an inner body having a second shaft portion disposed coaxially with the first shaft portion and having an annular wall portion connected to the second shaft portion and being rotatably supported and having a compression member with a pair of diametrically opposite roller members and with a pair of end bearing surfaces for urging the respective roller members against the radially inner surface.

By using the compression member with a pair of diametrically opposite roller members, equal and opposite radial forces from the roller members cancel out each other, which results in substantially no resultant side force on the inner body, whereby shaft misalignment and excessive bearing wear is avoided.

The foregoing and other objects, features and advantages will be apparent from the following description of the preferred embodiment of the invention as illustrated in the accompanying drawings.

DESCRIPTION OF THE PREFERRED EMBODIMENT

Figure 1:
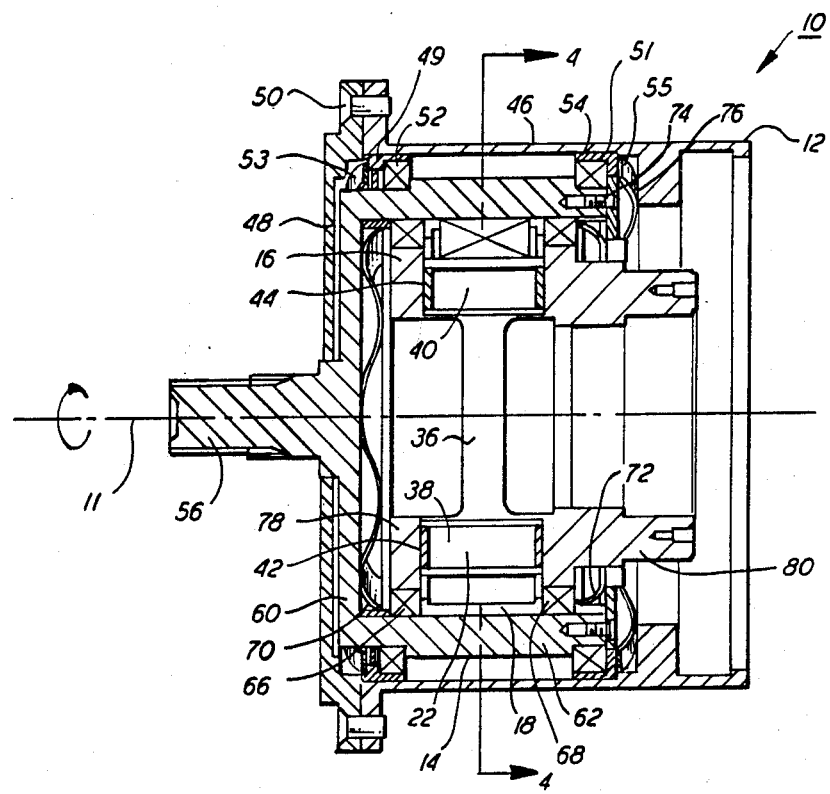
FIG. 1 is a section view of an overriding clutch according to the invention.
Figure 4:
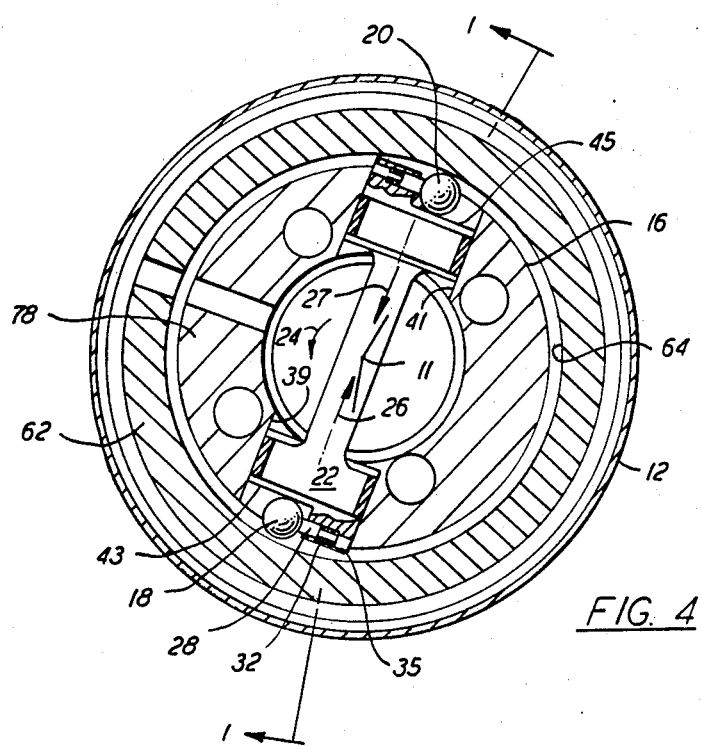
FIG. 4 section view as taken along the line 4—4 of FIG. 1.

As shown in FIGS. 1 and 4, an overriding clutch 10 is provided. Clutch 10, which has an axis 11, includes a support housing 12, an outer body 14, which is rotatably mounted on housing 12, and an inner body 16, which is rotatably mounted on outer body 14. Housing 12, outer body 14 and inner body 16 are coaxial along axis 11. Clutch 10 also includes a pair of diametrically opposite rollers 18, 20, which bear against compression member or large pin 22. A torque in direction 24 is applied by inner body 16 on outer body 14 due to the wedging action of rollers 18, 20. Radial forces 26, 27 are applied to compression member 22 by respective rollers 18, 20. Forces 26, 27 are approximately equal and opposite to each other.

Figure 5:
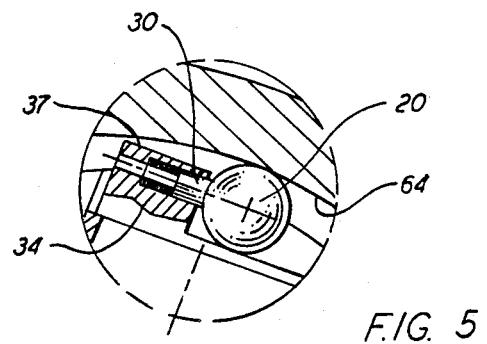
FIG. 5 is an enlarged view of a portion of FIG. 4.

As shown in FIGS. 4 and 5, rollers 18, 20 are urged by respective pins 28, 30 with respective springs 32, 34, into a wedging position.

As shown in FIGS. 1 and 4, compression member 22 has a center portion 36, and enlarged end portions 38, 40. End portions 38, 40 have respective sleeve bearings 42, 44 and have respective flat end bearing surfaces 43, 45. Sleeve bearings 42, 44 are received in respective drilled holes 39, 41 in inner body 16. End portions 38, 40 also have abutment portions 35, 37, which contain respective pins 28, 30 and respective springs 32, 34.

As shown in FIGS. 1 and 4, housing 12 has a circular wall section 46 and left end wall section 48. Sections 46, 48 are joined by peripherally spaced bolts 50. Housing 12 also has a bearing assembly 52, on the left side in FIG. 1; and has a bearing assembly 54 on the right side. Bearing 52 is supported by a spacer 49 which is urged axially inwardly by spring 53. Bearing 54 is supported by a spacer 51 which is also urged axially inwardly by its spring 55, for positioning outer body 14. Spacers 49, 51 are free to slide in wall section 46.

Figure 3:
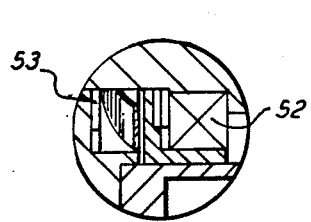
FIG. 3 is an enlarged view of another portion of FIG. 1
Figure 2:
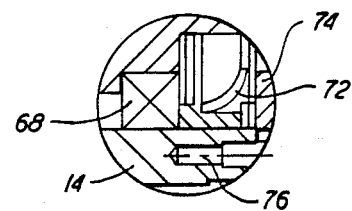
FIG. 2 an enlarged view of a portion of FIG. 1.

As shown in FIGS. 1, 2 and 3, outer body 14, which is driven by inner body 16, has a first shaft 56, which is disposed along axis 11. Outer body 14 also has an end wall 60 and a peripheral wall 62 with a radially inner bearing surface 64. Outer body 14 also has a left bearing assembly 66 and a right bearing assembly 68. Bearing 66 is urged axially inwardly by spring 70. Bearing 68 is urged axially inwardly by spring 72. Spring 72 is held in position by ring member 74, which is connected to outer body 14 by bolts 76.

Inner body 16, in FIG. 1, has an annular wall portion 78, and has a second shaft portion 80. In this embodiment, shaft portion 80 drives shaft portion 56.

In operation, inner body 16 transmits torque in torque direction 24 to outer body 14, as inner body 16 is rotated in direction 24. Each flat surface 43, 45 coacts with an adjacent portion of radially inner surface 64, forming a slot with a trapezoidal section for receiving a respective roller 18, 20. Each roller 18, 20 transmits a shear force from inner body 16 to outer body 14, thereby causing a torque in direction 24 on outer body 14. Also, inner body 16 will disengage from torque transmission, if outer body 14 rotates faster than inner body 16. Respective abutments 35, 37 limit respective rollers 18, 20 in their travel, when outer body 14 rotates faster than inner body 16.

Pins 28, 30 with respective springs 32, 34 help to keep rollers 18, 20 in contact with radially inner surface 64 of outer body 14. If outer body 14 rotates slower than inner body 16, pins 28, 30 urge roller 18, 20 into a wedging position. When the radial forces on rollers 18, 20 are great enough to produce a frictional torque on radially inner surface 64 which is greater than its opposing torque, outer body 14 will rotate with inner body 16. A pair of pins per roller, with respective springs, can also be used, in place of one pin per roller.

The radial forces 26, 27 exerted by respective rollers 18, 20 pass through center portion 36 and are equal and opposite forces. The forces, which rollers 18, 20 exert on radially inner surface 64 and which correspond to forces 26, 27, are equal forces. Thus, there is no side load or resultant force passing between inner body 16 and outer body 14. Also, the rollers 18, 20 are subject to equal contact loads and stresses.

Compression member 22 moves slightly in a radial direction in order to equalize forces thereon. Sleeve bearings 42, 44, which are made of a low friction material, reduce the friction between compression member 22 and inner body 16.

In summary, compression member 22 and its end rollers 18, 20 coact to avoid any side load and to prevent unequal radial forces. Radial forces 26, 27 pass through compression member and balance each other, whereby rollers 18, 20 also transmit equal shear forces and equal torques from inner body 16 to outer body 14.

A relatively small side load is transmitted by friction from compression member 22 to inner body 16. This friction force is minimized by anti-friction bearings 42, 44.

The advantages of the invention are indicated hereafter.

First, the problem of shaft misalignment and bearing wear of the prior art overriding clutch is avoided.

Second, the problem of unequal, peripherally spaced, radial forces acting on the inner body 16, and also on the outer body 14, which cause bending moments on shafts 56 and 80 about respective axes normal to the shaft axis 11, is also avoided.

While the invention has been described in its preferred embodiment, it is to be understood that the words which have been used are words of description rather than limitation and that changes may be made within the purview of the appended claims without departing from the true scope and spirit of the invention in its broader aspects.

For example, additional compression members, which have diametrically opposite roller members, can be provided. Such compression members can be axially spaced along axis 11 from compression member 22.

The embodiments of an invention in which an exclusive property or right is claimed are defined as follows:

1. An overriding clutch comprising:
   a support means;
   an outer body having a first shaft portion with an axis and having a radially inner surface and being rotatably mounted on the support means; and
   an inner body having a second shaft portion disposed coaxially with the first shaft portion and having an annular wall portion connected to the second shaft portion and being rotatably supported and having a compression member with a pair of diametrically opposite roller members and with a pair of end bearing surfaces, for urging the respective roller member against the radially inner surface by equal and opposite radial forces, for transmitting a torque between the inner body and the outer body, wherein the compression member includes:
   a center portion; and
   a pair of enlarged end portions received in a respective pair of holes in the annular wall portion, and having respective radially outer sides containing the end bearing surfaces.

2. The clutch of claim 1, wherein the enlarged end portions have a respective pair of anti-friction sleeve bearings which engage surfaces of the respective pair of holes in the annular wall portion.

3. The clutch of claim 2, wherein the radially outer sides of the enlarged end portions have respective abutments which have respective holes with respective pins and respective springs, for controlling a length of travel of the respective rollers and for urging the respective rollers into a wedging action between adjacent portions of the radially inner surface and the respective end bearing surfaces.

4. The clutch of claim 1, wherein the support means is a housing including:
   a circular wall section;
   an end wall section connected to the circular wall section; and
   a first pair of bearing assemblies mounted on the circular wall section for rotatably supporting the outer body.

5. The clutch of claim 4, wherein the outer body includes:
   a peripheral wall having the radially inner surfaces;
   an end wall connected to the peripheral wall and the first shaft portion; and
   a second pair of bearing assemblies mounted on the peripheral wall for rotatably supporting the inner body.

* * * * *